(12) United States Patent
Takeuchi et al.

(10) Patent No.: US 9,692,043 B2
(45) Date of Patent: Jun. 27, 2017

(54) ACTIVE MATERIAL FOR NONAQUEOUS ELECTROLYTE ENERGY STORAGE DEVICE

(71) Applicants: GS Yuasa International Ltd., Kyoto-shi, Kyoto (JP); Tokyo University of Science Educational Foundation Administrative Organization, Shinjuku-ku, Tokyo (JP)

(72) Inventors: Mitsue Takeuchi, Tokyo (JP); Naoaki Yabuuchi, Tokyo (JP); Shinichi Komaba, Tokyo (JP); Daisuke Endo, Kyoto (JP)

(73) Assignees: Tokyo University of Science Educational Foundation Administrative Organization, Tokyo (JP); GS Yuasa International Ltd., Kyoto (JP)

(*) Notice: Subject to any disclaimer, the term of this patent is extended or adjusted under 35 U.S.C. 154(b) by 102 days.

(21) Appl. No.: 14/778,871

(22) PCT Filed: Mar. 26, 2014

(86) PCT No.: PCT/JP2014/001755
§ 371 (c)(1),
(2) Date: Sep. 21, 2015

(87) PCT Pub. No.: WO2014/156153
PCT Pub. Date: Oct. 2, 2014

(65) Prior Publication Data
US 2016/0049640 A1    Feb. 18, 2016

(30) Foreign Application Priority Data

Mar. 27, 2013 (JP) ................. 2013-066543
Oct. 4, 2013 (JP) ................. 2013-209094

(51) Int. Cl.
*H01B 1/08* (2006.01)
*H01M 4/00* (2006.01)
(Continued)

(52) U.S. Cl.
CPC ........ *H01M 4/131* (2013.01); *C01G 45/1228* (2013.01); *C01G 49/009* (2013.01);
(Continued)

(58) Field of Classification Search
CPC ........... H01B 1/00; H01B 1/08; H01M 4/485; H01M 4/525; H01M 4/131
See application file for complete search history.

(56) References Cited

U.S. PATENT DOCUMENTS

| 6,623,890 | B2 | 9/2003 | Sunahara |
| 7,955,734 | B2* | 6/2011 | Shimizu ................ H01M 4/505 429/223 |

(Continued)

FOREIGN PATENT DOCUMENTS

| JP | 05151995 | 6/1993 |
| JP | 09147863 | 6/1997 |

(Continued)

OTHER PUBLICATIONS

International Search Report dated Jul. 1, 2014 filed in PCT/JP2014/001755.
(Continued)

*Primary Examiner* — Mark Kopec
(74) *Attorney, Agent, or Firm* — Rankin, Hill & Clark LLP

(57) ABSTRACT

An active material for a nonaqueous electrolyte energy storage device contains a lithium-transition metal composite oxide having a crystal structure attributable to space group Fm-3m and represented by the compositional formula (1):

$$Li_{1+x}Nb_yMe_zA_pO_2 \tag{1}$$

(Continued)

wherein Me is a transition metal including Fe and/or Mn, $0<x<1$, $0<y<0.5$, $0.25 \leq z<1$, A is an element other than Nb and Me, and $0 \leq p \leq 0.2$.

15 Claims, 1 Drawing Sheet

(51) Int. Cl.
    *H01M 4/131*     (2010.01)
    *H01M 4/485*     (2010.01)
    *H01M 4/505*     (2010.01)
    *C01G 45/12*     (2006.01)
    *C01G 49/00*     (2006.01)
    *H01M 4/525*     (2010.01)

(52) U.S. Cl.
    CPC .............. *H01B 1/08* (2013.01); *H01M 4/485* (2013.01); *H01M 4/505* (2013.01); *H01M 4/525* (2013.01); *C01P 2002/76* (2013.01); *C01P 2004/61* (2013.01)

(56) References Cited

U.S. PATENT DOCUMENTS

2011/0052990 A1     3/2011    Yanagida
2011/0294020 A1    12/2011    Jeong

FOREIGN PATENT DOCUMENTS

| JP | 2001250551 A2 | 9/2001 |
| JP | 2002151071 A2 | 5/2002 |
| JP | 2003077460 A2 | 3/2003 |
| JP | 2005235628 A2 | 9/2005 |
| JP | 2009295290 A2 | 12/2009 |
| JP | 2010126399 A2 | 6/2010 |
| JP | 2010135187 A2 | 6/2010 |
| JP | 2011071090 A2 | 4/2011 |
| JP | 2012503293 | 2/2012 |

OTHER PUBLICATIONS

Hirayama et al., "Structure and electrode reactions of layered rocksalt LiFeO2 nanoparticles for lithium battery cathode", Journal of Power Sources, vol. 196, pp. 6809-6814, 2011.; English text.

Yabuuchi et al., "Crystal Structures and Electrochemical Properties of Li3NbO4-based Oxides for Li Batteries", Abstract of the 54th Battery Symposium in Japan, p. 163, 2013.; English abstract included.

* cited by examiner

ACTIVE MATERIAL FOR NONAQUEOUS ELECTROLYTE ENERGY STORAGE DEVICE

TECHNICAL FIELD

The present invention relates to an active material for a nonaqueous electrolyte energy storage device and also to a nonaqueous electrolyte energy storage device using the same.

BACKGROUND ART

Lithium niobate ($Li_3NbO_4$) has been applied to a ceramic material, etc. However, the energy density of $Li_3NbO_4$ that can be used for charge-discharge is low, and thus it has not been used as an active material for a nonaqueous electrolyte energy storage device.

As a technique for suppressing the degradation of a battery due to overdischarge, Patent Document 1 discloses "a nonaqueous electrolyte secondary battery comprising a positive electrode made of $LiCoO_2$ and a negative electrode made of a carbonaceous material, the nonaqueous electrolyte secondary battery being configured such that the positive electrode contains, in addition to the main active material $LiCoO_2$, a sub-active material having a discharge potential of 3 V or less relative to Li, while the negative electrode contains dischargeable Li in the carbonaceous material." (claim 1). Here, $Li_3NbO_4$ is mentioned as a preferred sub-active material. However, it is not described in working examples.

Incidentally, as an example of the niobium (Nb) substitution of a $LiNiO_2$-based active material, Patent Document 2 discloses, as a technique for providing an active material with high thermal stability and high discharge capacity "a positive active material for a nonaqueous secondary battery, comprising a composition composed of at least one compound containing lithium, nickel, cobalt, element M, niobium, and oxygen and represented by the general formula: $Li_aNi_{1-x-y-z}Co_xM_yNb_xO_b$ (wherein M is at least one element selected from the group consisting of Mn, Fe, and Al, $1 \le a \le 1.1$, $0.1 \le x \le 0.3$, $0 \le y \le 0.1$, $0.01 \le z \le 0.05$, and $2 \le b \le 2.2$), wherein when, at the time of initial discharge, a discharge capacity of α [mAh/g] is shown at a positive electrode potential (vs. Li/Li$^+$) within a range of 2 V to 1.5 V, and the half-width of the (003) plane of the layered crystal structure thereof in the X-ray diffraction is expressed as β [deg], α and β satisfy the conditions $60 \le \alpha \le 150$ and $0.14 \le \beta \le 0.20$, respectively, at the same time." (claim 1).

Incidentally, as an active material containing niobium, Patent Document 3 discloses a technique of using "a negative active material for a lithium secondary battery, comprising a compound represented by the following chemical formula 1:

$$Li_{1+x}Nb_{1-x-y}M_yO_{2+z} \qquad \text{[chemical formula 1]}$$

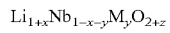

[wherein $0.01 \le x \le 0.5$, $0 \le y \le 0.3$, $-0.2 \le z \le 0.2$, and M is an element selected from the group consisting of V, Cr, Fe, Co, Ni, Cu, Zn, Zr, Mo, W, Ag, Sn, Ge, Si, Al, and combinations thereof]." (claim 1). With respect to this negative active material, there is the following description: "In the structure of a lithium-transition metal oxide, such as $LiCoO_2$, conventionally used as a positive active material, by substituting Co with another metal element "Nb" and another second metal element "M," a lithium-metal oxide that allows for the easy desorption/insertion of lithium ions has been produced. Using this as a negative active material for a lithium secondary battery, it has been found that this negative active material shows high capacity and excellent life characteristics." Such a material has a crystal structure of hexagonal space group "R-3m" like $LiCoO_2$. Specifically, Example 5-1 illustrates a negative active material represented by the compositional formula $Li_{1.1}Nb_{0.89}Fe_{0.01}O_2$.

Patent Document 3 shows an active material containing niobium and represented by the chemical formula $Li_{1+x}Nb_{1-x-y}M_yO_{2+z}$. In this active material, because of the low proportion of the metal element M, its discharge capacity is low. Incidentally, this active material is aimed at the insertion/desorption of Li in $LiNbO_2$ having a crystal structure of hexagonal space group "R-3m" like $LiCoO_2$. Accordingly, the negative active material described in Patent Document 3 has a crystal structure of hexagonal space group "R-3m" like $LiCoO_2$.

Patent Document 4 discloses a technique of using "a negative electrode for a nonaqueous electrolyte secondary battery, comprising an active material containing a lithium-niobium composite oxide, the lithium-niobium composite oxide being represented by the general formula (1): $Li_xNb_{1-y}M_yO_2$, wherein $1 \le x \le 2$ and $0 \le y \le 0.5$ are satisfied, x is a value that changes in association with the charge-discharge of a battery, and M is at least one element selected from the group consisting of V, Cr, Mn, Fe, Co, Ni, Mo, and W." (claim 1). As a specific example, Example 6 illustrates a negative active material represented by the compositional formula $LiNb_{0.75}Mn_{0.25}O_2$.

Patent Document 4 describes as follows: "The range of y that specifies the content of the element M should satisfy $0 \le y \le 0.5$. However, in terms of sufficiently obtaining the addition effect of the element M, it is preferable that $0.25 \le y \le 0.5$ is satisfied. When y is too large, the cycle performance at low temperatures significantly decreases. Incidentally; the discharge capacity also significantly decreases." This description shows that a decrease in the proportion of Nb in the metal elements in the chemical formula results in a decreased discharge capacity. Incidentally, as in Patent Document 3, the active material is based on $LiNbO_2$, wherein Nb is partially substituted with other elements. Accordingly, the negative active material described in Patent Document 4 has a crystal structure of hexagonal space group "R-3m" like $LiCoO_2$.

PRIOR ART DOCUMENTS

Patent Documents

Patent Document 1: JP-A-5-151995
Patent Document 2: JP-A-2002-151071
Patent Document 3: JP-A-2012-503293
Patent Document 4: JP-A-2009-295290

Non-Patent Document

Non-Patent Document 1: M. Hirayama et al., Journal of Power Sources, 196, pp. 6809-6814, 2011

DISCLOSURE OF THE INVENTION

Problems to be Solved by the Invention

The present invention provides a novel Nb-containing active material for a nonaqueous electrolyte energy storage device and also a nonaqueous electrolyte energy storage device using the same.

Means for Solving the Problems

The present invention is an active material for a nonaqueous electrolyte energy storage device, which contains a lithium-transition metal composite oxide represented by the compositional formula (1):

$$Li_{1+x}Nb_yMe_zA_pO_2 \quad (1)$$

wherein Me is a transition metal including Fe and/or Mn, $0<x<1$, $0<y<0.5$, $0.25 \le z<1$, A is an element other than Nb and Me, and $0 \le p \le 0.2$.

Advantages of the Invention

According to the prevent invention, a novel active material for a nonaqueous electrolyte energy storage device, which contains niobium (Nb) and iron (Fe) and/or manganese (Mn), can be provided.

BEST MODE FOR CARRYING OUT THE INVENTION

Figure 1:
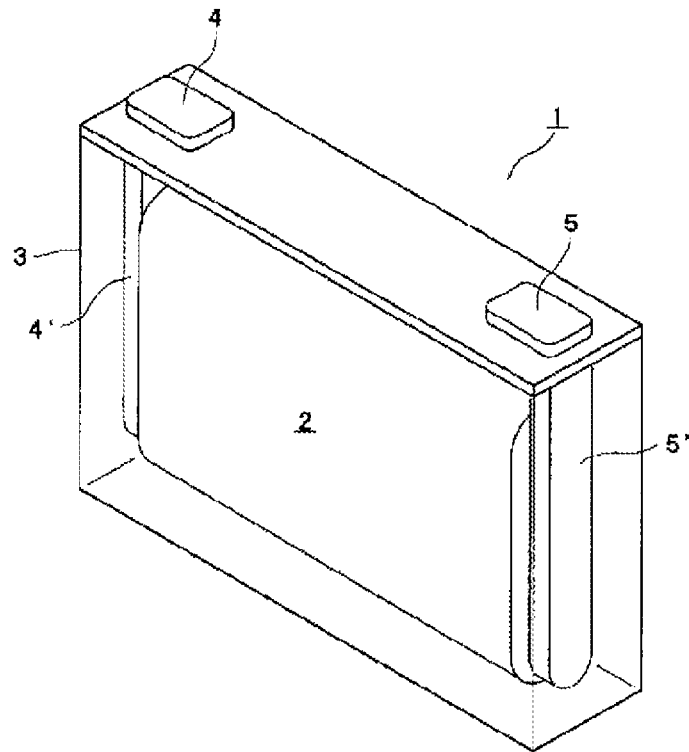
FIG. 1: an external perspective view showing one embodiment of the nonaqueous electrolyte secondary battery according to the present invention.

The configuration and effects of the present invention will be described together with the technical concept. However, the operation mechanism includes presumptions, and whether it is right or wrong does not limit the present invention. Incidentally, the present invention can be performed in other various forms without deviating from the spirit or main feature thereof. Accordingly, the embodiments and experimental examples given below are merely examples in every way, and they should not be construed as restrictive. Further, variations and modifications falling under the scope equivalent to the claims are all within the scope of the present invention.

The active material for a nonaqueous electrolyte energy storage device of the present invention is characterized in that a lithium-transition metal composite oxide contains a solid solution of $Li_3NbO_4$—$LiMeO_2$ (Me is a transition metal). The lithium-transition metal composite oxide has a crystal structure attributable to space group Fm-3m. Accordingly, it is understood that in the lithium-transition metal composite oxide, the valence of Nb is about +5.

Arranging the oxygen coefficient, the solid solution of $Li_3NbO_4$—$LiMeO_2$ (Me is a transition metal) is represented by the following formula:

$$aLiMeO_2 \cdot (1-a)Li_{3/2}Nb_{1/2}O_2 \quad (0<a<1).$$

This can be transformed into the following formula:

$$Li_{1+(1-a)/2}Nb_{(1-a)/2}Me_aO_2.$$

Accordingly, when this is represented by the following formula:

$$Li_{1+x}Nb_yMe_zO_2.$$

the possible range of y is $0<y<0.5$.

Adding an optional element A, the above formula can be represented by the following formula:

$$Li_{1+x}Nb_yMe_zA_pO_2 \quad (1)$$

wherein Me is a transition metal including Fe and/or Mn, $0<x<1$, $0<y<0.5$, $0.25 \le z<1$, A is an element other than Nb and Me, and $0 \le p \le 0.2$.

Here, when z satisfies $0.25 \le z<1$, a lithium-transition metal composite oxide with high energy density and discharge capacity can be achieved. In particular, when $z \le 0.7$, the energy density and discharge capacity are further increased, and thus this is preferable. Incidentally, $0.05 \le y$ is preferable, and $0.15 \le y$ is more preferable. Incidentally, $y \le 0.35$ is preferable.

From the above formula transformation process, it is understood that when the solid solution satisfies the relational expression $aLiMeO_2 \cdot (1-a)Li_{3/2}Nb_{1/2}O_2$ $(0<a<1)$, y and z satisfy the relational expression $2y+z=1$. Practically, within a range of $0.8 \le 2y+z \le 1.2$, a lithium-transition metal composite oxide with high energy density and discharge capacity can be achieved, and the present invention can be implemented without deviating from the technical concept of the present invention.

In particular, when the relation $0.9 \le 2y+z \le 1.1$ is satisfied, the active material for a nonaqueous electrolyte energy storage device containing such a lithium-transition metal composite oxide shows even higher energy density and discharge capacity, and thus it is more preferable.

Further, when the relation $x=y$, $2y+z=1$, and $0.3 \le z \le 0.7$ is satisfied, the active material for a nonaqueous electrolyte energy storage device containing such a lithium-transition metal composite oxide shows even higher energy density and discharge capacity, and thus it is particularly preferable.

Incidentally, when Me includes Mn, the active material for a nonaqueous electrolyte energy storage device containing such a lithium-transition metal composite oxide shows high energy density and discharge capacity, and thus it is preferable.

Further, in the active material for a nonaqueous electrolyte energy storage device according to the present invention, when the lithium-transition metal composite oxide contains a solid solution of $Li_3NbO_4$—$LiFeO_2$—$LiMnO_2$, an active material for a nonaqueous electrolyte energy storage device with even higher discharge capacity can be provided.

Thus, the lithium-transition metal composite oxide according to the present invention can be represented by the compositional formula (2):

$$Li_{1+x}Nb_yFe_aMn_bA_pO_2 \quad (2)$$

wherein $0<x<0.5$, $0<y<0.5$, $0<a<1$, $0<b<1$, $0.25 \le a+b<1$, A is an element other than Nb and Me, and $0 \le p \le 0.2$.

When the relation $0.1<a<0.6$, $0.1<b<0.6$, and $0.3 \le a+b<0.8$ is satisfied in the above compositional formula (2), the active material for a nonaqueous electrolyte energy storage device containing such a lithium-transition metal composite oxide has even higher discharge capacity, and thus it is more preferable.

Incidentally, when the relation $0.1<a \le 0.3$, $0.3 \le b \le 0.45$, and $0.35 \le a+b \le 0.75$ is satisfied in the compositional formula (2), the active material for a nonaqueous electrolyte energy storage device containing such a lithium-transition metal composite oxide has yet higher discharge capacity, and thus it is particularly preferable.

In the compositional formula (1), Me indispensably includes Fe or Mn. This does not exclude the presence of transition metals other than Fe and Mn in Me. Transition metals other than Fe and Mn are not limited, but are preferably transition metals such as Ni, Co, and Cu. The optional element A is not limited, and examples thereof include alkali metals and alkaline-earth metals, such as Na and Ca, and elements such as Zn, In, and Al.

The active material for a nonaqueous electrolyte energy storage device of the present invention may be mixed with other active materials in use.

It is preferable that the active material for a nonaqueous electrolyte energy storage device of the invention of the present application in powder form has an average particle size of 100 μm or less. In particular, for the purpose of improving the output characteristic of a nonaqueous electrolyte energy storage device, it is preferable that the size is 30 μm or less. Incidentally, it is preferable that the size of primary particles of the lithium-transition metal composite oxide is 1 to 3 μM.

Next, a method for producing the active material for a nonaqueous electrolyte energy storage device of the present invention will be described.

Basically the active material for a nonaqueous electrolyte energy storage device of the present invention can be obtained by adjusting raw materials so that the metal elements (Li, Nb, and Me) to form an active material will be contained according to the intended composition of the active material (lithium-transition metal composite oxide), and finally firing the raw materials. However, with respect to the amount of Li raw material, in consideration of the loss of part of the Li raw material during firing, the Li raw material is preferably contained in an excess of about 1 to 5%, and more preferably contained in an excess of about 3%.

As methods for producing a lithium-transition metal composite oxide having the intended composition, a so-called "solid-phase process," in which salts of Li, Nb, and Me, respectively are mixed and fired, and a "coprecipitation process," in which a coprecipitation precursor having Nb and Me in one particle is previously prepared, and a Li salt is mixed therewith and fired, as well as "evaporation to dryness," a "spray-drying process," etc. can be mentioned.

In the present invention, the "solid-phase process" is employed as mentioned later in the Examples. When the "solid-phase process" is employed, no special apparatus is required, the synthesizing process can be simplified, and the synthesis cost of the active material can be reduced; thus, this is preferable.

The firing temperature in synthesis in the "solid-phase process" mentioned above, etc., is not particularly limited as long as it is a temperature at which the intended lithium-transition metal composite oxide is produced. However, when the temperature is equal to or higher than a temperature at which the lithium salt used as a raw material melts, crystallization is promoted, resulting in an increase in the charge-discharge capacity; thus, this is preferable. Specifically, although this depends on the kind of lithium salt to be used, it is preferable that the firing temperature is 500° C. or higher. Further, for the purpose of moderately increasing the crystallinity of the produced lithium-transition metal composite oxide and improving the charge-discharge characteristics, it is more preferable that the temperature is 800° C. or higher.

Incidentally, in the present invention, for the purpose of supplementing the electron conductivity of the lithium-transition metal composite oxide, a conducting substance may be provided to the particle surface of the active material for a nonaqueous electrolyte energy storage device. Conducting substances are not particularly limited as long as they have higher electron conductivity than the lithium-transition metal composite oxide. Examples thereof include metals, metal oxides, graphite carbon such as acetylene black, carbon nanotubes, carbon resulting from the thermal decomposition of an organic substance, and conductive polymers. In the present invention, graphite carbon is preferable.

As a method for providing a conducting substance on the particle surface of the active material for a nonaqueous electrolyte energy storage device, a method in which a conducting substance is physically pressure-bonded to the particle surface of the active material, such as mechanofusion, is preferable. In the present invention, as described below in the Examples, the firing of the active material for a nonaqueous electrolyte energy storage device is followed by a crushing step using a ball mill. When a conducting substance is present in this step, the conducting substance can be provided to the particle surface.

As a method for providing a conducting substance on the particle surface of the active material for a nonaqueous electrolyte energy storage device, a method of utilizing the thermal decomposition of an organic compound is also possible. In this method, the active material for a nonaqueous electrolyte energy storage device after firing is mixed with an organic compound, and heated in an inert or reducing atmosphere to a temperature higher than the thermal decomposition temperature of the organic substance, whereby the particle surface of the active material for a nonaqueous electrolyte energy storage device can be covered with carbon. However, depending on the kind of transition metal contained in the lithium-transition metal composite oxide, it may happen that even the metal is reduced during heating, resulting in a change in the intended composition of the lithium-transition metal composite oxide. Thus, caution has to be exercised.

Negative electrode materials used for the negative electrode of a nonaqueous electrolyte secondary battery according to the present invention are not limited, and may be any material selected from negative electrode materials capable of depositing or storing lithium ions. Examples thereof include titanium-based materials such as lithium titanate having a spinel crystal structure typified by $La[Li_{1/3}Ti_{5/3}]O_4$; alloy-based materials including Si, Sb, Sn, etc.; lithium metal; lithium alloys such as lithium-silicon, lithium-aluminum, lithium-lead, lithium-tin, lithium-aluminum-tin, and lithium-gallium; lithium composite oxides such as lithium titanium; silicon oxide; alloys capable of storing and releasing lithium; and carbon materials such as graphite, hard carbon, low-temperature baked carbon, and amorphous carbon.

It is preferable that the negative electrode material in powder form has an average particle size of 100 μm or less. In order to obtain a powder in a predetermined shape, a grinder or a classifier is used. For example, a mortar, a ball mill, a sand mill, a vibration ball mill, a planetary ball mill, a jet mill, a counter jet mill, a swirling-flow-type jet mill, or a sieve is used. For grinding, it is also possible to employ wet grinding using water or an organic solvent such as hexane. The classification method is not particularly limited, and a sieve, a wind classifier, or the like is used as necessary in a dry or wet process.

The positive active material and the negative electrode material, which are main components of a positive electrode and a negative electrode, have been described above in detail. However, in addition to the main components, the positive electrode and the negative electrode may also contain other components, such as a conducting agent, a binder, a thickener, and a filler.

The conducting agent is not limited as long as it is an electron conductive material that does not adversely affect the battery performance. Usually, it is possible to incorporate one of or a mixture of conductive materials including natural graphite such as scaly graphite, flaky graphite, and earthy graphite; artificial graphite; carbon black; acetylene black; ketjen black; carbon whisker; carbon fibers; metal powders of copper, nickel, aluminum, silver, gold, and the like; metal fibers; conductive ceramic materials; etc.

Among them, in terms of electron conductivity and coating properties, it is preferable to use acetylene black as a conducting agent. The amount of conducting agent added is preferably 0.1 wt % to 50 wt %, particularly preferably 0.5 wt % to 30 wt %, based on the total weight of the positive electrode or the negative electrode. In particular, when acetylene black is crushed into ultrafine particles of 0.1 to 0.5 μm and used, the necessary amount can be reduced; thus, this is preferable. The method for mixing them is physical mixing, and uniform mixing is ideal. Therefore, it is possible to perform mixing in a dry or wet process using a powder mixer such as a V-shaped mixer, an S-shaped mixer, a grinding machine, a ball mill, or a planetary ball mill.

As the binder, it is usually possible to use one of or a mixture of two or more of thermoplastic resins such as polytetrafluoroethylene (PTFE), polyvinylidene fluoride (PVDF), polyethylene, and polypropylene; and polymers having rubber elasticity such as ethylene-propylene-diene terpolymer (EPDM), sulfonated EPDM, styrene-butadiene rubber (SBR), and fluororubber. The amount of binder added is preferably 1 to 50 wt %, particularly preferably 2 to 30 wt %, based on the total weight of the positive electrode or the negative electrode.

The filler may be any material as long as it does not adversely affect the energy storage device performance. Usually, an olefin polymer such as polypropylene or polyethylene, amorphous silica, alumina, zeolite, glass, carbon, or the like is used. The amount of filler added is preferably 30 wt % or less based on the total weight of the positive electrode or the negative electrode.

The positive electrode and the negative electrode are preferably produced by kneading the main component (a positive active material in the case of a positive electrode and a negative electrode material in the case of a negative electrode) and other materials to form a mixture, then mixing the same with an organic solvent, such as N-methylpyrrolidone or toluene, or water, and applying or pressure-bonding the obtained mixed liquid onto the current collector described below, followed by a heating treatment at a temperature of about 50° C. to 250° C. for about 2 hours. The application method is not limited, but it is preferable to perform application to an arbitrary thickness and an arbitrary form by roller coating using an applicator roll or the like, screen coating, doctor blade coating, spin coating, bar coater, or the like, for example.

The nonaqueous solvent contained in the nonaqueous electrolyte used for the nonaqueous electrolyte energy storage device according to the present invention is not limited, and nonaqueous solvents that have been generally proposed for use in a lithium battery, etc., are usable. The nonaqueous solvent used for the nonaqueous electrolyte may be, but is not limited to, one of or a mixture of two or more of cyclic carbonates such as propylene carbonate, ethylene carbonate, butylene carbonate, chloroethylene carbonate, and vinylene carbonate; cyclic esters such as γ-butyrolactone and γ-valerolactone; linear carbonates such as dimethyl carbonate, diethyl carbonate, and ethylmethyl carbonate; linear esters such as methyl formate, methyl acetate, and methyl butyrate; tetrahydrofuran and derivatives thereof; ethers such as 1,3-dioxane, 1,4-dioxane, 1,2-dimethoxyethane, 1,4-dibutoxyethane, and methyl diglyme; nitriles such as acetonitrile and benzonitrile; dioxolane and derivatives thereof; and ethylene sulfide, sulfolane, sultone, and derivatives thereof.

Examples of electrolyte salts used for the nonaqueous electrolyte include inorganic ion salts containing one of lithium (Li), sodium (Na), and potassium (K), such as $LiClO_4$, $LiBF_4$, $LiAsF_6$, $LiPF_6$, LiSCN, LiBr, LiI, $Li_2SO_4$, $Li_2B_{10}Cl_{10}$, $NaClO_4$, NaI, NaSCN, NaBr, $KClO_4$, and KSCN, and organic ion salts such as $LiCF_3SO_3$, $LiN(CF_3SO_2)_2$, $LiN(C_2F_5SO_2)_2$, $LiN(CF_3SO_2)$, $(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4$, $NClO_4$, $(n-C_4H_9)_4NI$, $(C_2H_5)_4N$-maleate, $(C_2H_5)_4N$-benzoate, $(C_2H_5)_4N$-phtalate, lithium stearylsulfonate, lithium octylsulfonate, and lithium dodecylbenzenesulfonate. These ionic compounds may be used alone, or as a mixture of two or more kinds thereof.

Further, when a mixture of $LiPF_6$ or $LiBF_4$ and a lithium salt having a perfluoroalkyl group, such as $LiN(C_2F_5SO_2)_2$, is used, the viscosity of the electrolyte can be further reduced. This can further enhance the low-temperature characteristics and suppress the self-discharge, and thus it is more preferable.

Incidentally it is also possible to use an ambient-temperature molten salt or an ionic liquid as a nonaqueous electrolyte.

In order to reliably obtain a nonaqueous electrolyte energy storage device having high energy storage device characteristics, the electrolyte salt concentration in the nonaqueous electrolyte is preferably 0.1 mol/l to 5 mol/l, and more preferably 0.5 mol/l to 2.5 mol/l.

As a separator, it is preferable to use one of or a combination of a porous membrane, a nonwoven fabric, and the like having excellent high rate discharge performance. Examples of materials to form the separator for a nonaqueous electrolyte battery include polyolefin resins typified by polyethylene and polypropylene; polyester resins typified by polyethylene terephthalate and polybutylene terephthalate; polyvinylidene fluoride; vinylidene fluoride-hexafluoropropylene copolymer; vinylidene fluoride-perfluorovinylether copolymer; vinylidene fluoride-tetrafluoroethylene copolymer; vinylidene fluoride-trifluoroethylene copolymer; vinylidene fluoride-fluoroethylene copolymer; vinylidene fluoride-hexafluoroacetone copolymer; vinylidene fluoride-ethylene copolymer; vinylidene fluoride-propylene copolymer; vinylidene fluoride-trifluoropropylene copolymer; vinylidene fluoride-tetrafluoroethylene-hexafluoropropylene copolymer; and vinylidene fluoride-ethylene-tetrafluoroethylene copolymer.

In terms of strength, it is preferable that the porosity of the separator is 98 vol % or less. Incidentally, in terms of charge-discharge characteristics, it is preferable that the porosity is 20 vol % or more.

Incidentally, as the separator, it is also possible to use, for example, a polymer gel formed of a polymer, such as acrylonitrile, ethylene oxide, propylene oxide, methyl methacrylate, vinyl acetate, vinyl pyrrolidone, or polyvinylidene fluoride, and an electrolyte. When a nonaqueous electrolyte is used in the gel state as mentioned above, this is effective in preventing liquid leakage and is preferable in this respect.

Further, when the above porous membrane, nonwoven fabric, or the like is used in combination with a polymer gel as a separator, this improves the electrolyte solution retentivity and thus it is preferable. That is, when the surface and the micropore wall surface of a polyethylene microporous film are covered with a solvent-compatible polymer to a thickness of several micrometers or less to form a film, and an electrolyte is retained into the micropores of the film, the solvent-compatible polymer turns into a gel.

Examples of solvent-compatible polymers mentioned above include, in addition to polyvinylidene fluoride, crosslinked polymers including an acrylate monomer having an ethylene oxide group, an ester group, or the like, an epoxy monomer, a monomer having an isocyanate group, or the like. The monomers may be subjected to a crosslinking reaction using heating or ultraviolet light (UV) together with a radical initiator, or using active light such as electron beam (EB).

FIG. 1 shows a schematic diagram of a rectangular nonaqueous electrolyte secondary battery 1, which is one embodiment of the nonaqueous electrolyte secondary battery according to the present invention. Incidentally, the diagram shows a perspective view of the inside of the container. In the nonaqueous electrolyte secondary battery 1 shown in FIG. 1, an electrode group 2 is stored in the battery container 3. The electrode group 2 is formed by winding a positive electrode provided with a positive active material, a negative electrode provided with a negative active material, and a separator interposed therebetween. The positive electrode is electrically connected to a positive electrode terminal 4 via a positive electrode lead 4', while the negative electrode is electrically connected to a negative electrode terminal 5 via a negative electrode lead 5'.

Figure 2:
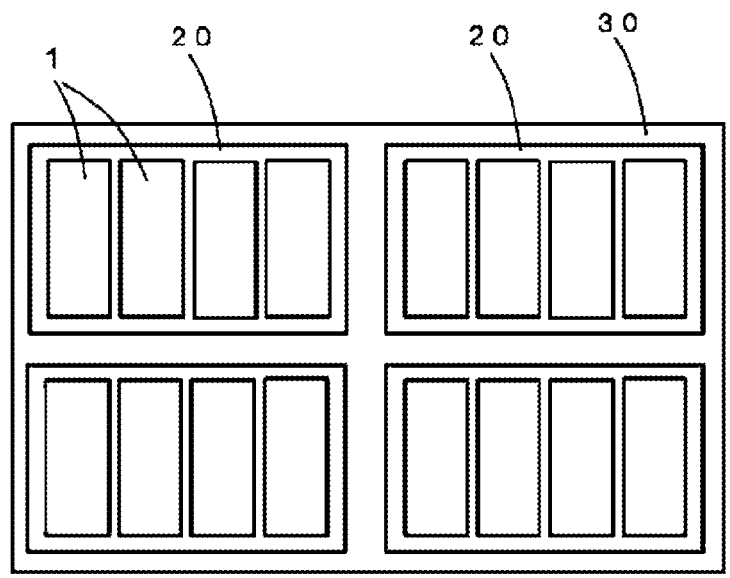
FIG. 2: a schematic diagram showing an energy storage apparatus formed of an assembly of a plurality of nonaqueous electrolyte secondary batteries according to the present invention.

The configuration of the nonaqueous electrolyte secondary battery according to the present invention is not particularly limited, and examples thereof include a cylindrical battery, a prismatic battery (rectangular battery), and a flat battery. The present invention can also be implemented as an energy storage apparatus provided with a plurality of nonaqueous electrolyte secondary batteries. FIG. 2 shows one embodiment of the energy storage apparatus. In FIG. 2, an energy storage apparatus 30 includes a plurality of energy storage units 20. Each of the energy storage units 20 includes a plurality of nonaqueous electrolyte secondary batteries 1. The energy storage apparatus 30 can be mounted as an automotive power supply for electric vehicles (EV), hybrid electric vehicles (HEV), plug-in hybrid electric vehicles (PHEV), etc.

EXAMPLE 1

First, 1.101 g of lithium carbonate ($Li_2CO_3$) (manufactured by Nacalai Tesque), 1.026 g of diniobium pentoxide ($Nb_2O_5$) (manufactured by Nacalai Tesque), and 0.529 g of diiron trioxide ($Fe_2O_3$) (manufactured by Nacalai Tesque) were weighed. These powders were placed in an alumina pot provided with ten alumina balls having a diameter of 10 mm, and set in a planetary ball mill (manufactured by FRITSCH, Model No.: pulverisette 5), followed by mixing at 200 rpm for 1 hour. Thus, a powder mixture having a Li:Nb:Fe molar ratio of 135:35:30 was prepared. This powder mixture was molded using a pelletizer at a pressure of 6 MPa to give pellets having a diameter of 25 mm. The amount of powder mixture to be pelletized was determined by calculation such that the mass of the expected final product would be 2 g. One such pellet was placed on an alumina boat having a total length of about 100 mm and then installed in a box electric furnace (Model No.: AMF20). In an air atmosphere and under ambient pressure, the temperature was raised from ambient temperature to 950° C. over about 10 hours, and firing was performed at 950° C. for 24 hours. The internal dimension of the box electric furnace is 10 cm in length, 20 cm in width, and 30 cm in depth, and heating wires are placed therein at intervals of 20 cm in the width direction. After firing, the pellet was taken out and crushed for a few minutes in an automatic agate mortar to make the particle size uniform. A lithium-transition metal composite oxide of Example 1 was thus produced.

EXAMPLES 2 to 9

Lithium-transition metal composite oxides of Examples 2 to 9 were produced by the same procedure as in Example 1, except that in the powder mixture preparation process, lithium carbonate, diniobium pentoxide, and diiron trioxide were weighed such that the Li:Nb:Fe molar ratio was 130:30:40 in Example 2, 125:25:50 in Example 3, 120:20:60 in Example 4, 115:15:70 in Example 5, 110:10:80 in Example 6, 105:5:90 in Example 7, 130:20:50 in Example 8, and 130:40:30 in Example 9.

COMPARATIVE EXAMPLES 1 to 4

Lithium-transition metal composite oxides of Comparative Examples 1 to 4 were produced by the same procedure as in Example 1, except that in the powder mixture preparation process, lithium carbonate, diniobium pentoxide, and diiron trioxide were weighed such that the Li:Nb:Fe molar ratio was 150:50:0 in Comparative Example 1, 145:45:10 in Comparative Example 2, 140:40:20 in Comparative Example 3, and 100:0:100 in Comparative Example 4.

EXAMPLE 10

First, 1.137 g of lithium carbonate ($Li_2CO_3$) (manufactured by Nacalai Tesque), 1.029 g of diniobium pentoxide ($Nb_2O_5$) (manufactured by Nacalai Tesque), and 0.524 g of dimanganese trioxide ($Mn_2O_3$) (manufactured by Nacalai Tesque) were weighed. These powders were placed in an alumina pot provided with ten alumina balls having a diameter of 10 mm, and set in a planetary ball mill (manufactured by FRITSCH, Model No.: pulverisette 5), followed by mixing at 200 rpm for 1 hour. Thus, a powder mixture having a Li : Nb : Mn molar ratio of 135:35:30 was prepared. This powder mixture was molded using a pelletizer at a pressure of 6 MPa to give pellets having a diameter of 25 mm. The amount of powder mixture to be pelletized was determined by calculation such that the mass of the expected final product would be 2 g. One such pellet was placed on an alumina boat having a total length of about 100 mm and then installed in a tube furnace. in a nitrogen atmosphere and under ambient pressure, the temperature was raised from ambient temperature to 950° C. over about 10 hours, and firing was performed at 950° C. for 24 hours. Subsequently, the pellet was taken out and crushed for a few minutes in an automatic agate mortar to make the particle size uniform. A lithium-transition metal composite oxide of Example 10 was thus produced.

EXAMPLES 11 to 20

Lithium-transition metal composite oxides of Examples 11 to 20 were produced by the same procedure as in Example 10, except that in the powder mixture preparation process, lithium carbonate, diniobium pentoxide, and dimanganese trioxide were weighed such that the Li:Nb:Mn molar ratio was 130:30:40 in Example 11, 125:25:50 in Example 12, 120:20:60 in Example 13, 115:15:70 in Example 14, 110:10:80 in Example 15, 105:5:90 in Example 16, 130:35:35 in Example 17, 130:25:45 in Example 18, 130:45:25 in Example 19, and 130:15:55 in Example 20.

COMPARATIVE EXAMPLES 5 to 7

Lithium-transition metal composite oxides of Comparative Examples 5 to 7 were produced by the same procedure as in Example 10, except that in the powder mixture preparation process, lithium carbonate, diniobium pentoxide, and dimanganese trioxide were weighed such that the Li:Nb:Mn molar ratio was 145:45:10 in Comparative Example 5, 140:40:20 in Comparative Example 6, and 100:0:100 in Comparative Example 7.

EXAMPLE 21

First, 1.137 g of lithium carbonate ($Li_2CO_3$) (manufactured by Nacalai Tesque), 1.029 g of diniobium pentoxide ($Nb_2O_5$) (manufactured by Nacalai Tesque), 0.529 g of diiron trioxide ($Fe_2O_3$) (manufactured by Nacalai Tesque), and 0.524 g of dimanganese trioxide ($Mn_2O_3$) (manufactured by Nacalai Tesque) were weighed. These powders were placed in an alumina pot provided with ten alumina balls having a diameter of 10 mm, and set in a planetary ball mill (manufactured by FRITSCH, Model No.: pulverisette 5), followed by mixing at 200 rpm for 1 hour. Thus, a powder mixture having a Li:Nb:Fe:Mn molar ratio of 121.5: 21.5:19:38 was prepared. This powder mixture was molded using a pelletizer at a pressure of 6 MPa to give pellets having a diameter of 25 mm. The amount of powder mixture to be pelletized was determined by calculation such that the mass of the expected final product would be 2 g. One such pellet was placed on an alumina boat having a total length of about 100 mm and then installed in a tube furnace. In a nitrogen atmosphere and under ambient pressure, the temperature was raised from ambient temperature to 950° C. over about 10 hours, and firing was performed at 950° C. for 24 hours. Subsequently, the pellet was taken out and crushed for a few minutes in an automatic agate mortar to make the particle size uniform. A lithium-transition metal composite oxide of Example 21 was thus produced.

EXAMPLES 22 to 28

Lithium-transition metal composite oxides of Examples 22 to 28 were produced by the same procedure as in Example 21, except that in the powder mixture preparation process, lithium carbonate, diniobium pentoxide, diiron trioxide, and dimanganese trioxide were weighed such that the Li:Nb:Fe:Mn molar ratio was 112:12:38:38 in Example 22, 131:31:19:19 in Example 23, 121.5:21.5:38:19 in Example 24, 112:12:57:19 in Example 25, 131:31:19:57 in Example 26, 125:25:12:38 in Example 27, and 115.5:15.5:12:57 in Example 28.

(X-ray Diffraction Measurement)

The lithium-transition metal composite oxides of Examples 1 to 20 and Comparative Examples 1 to 8 were subjected to powder X-ray diffraction measurement using an X-ray diffractometer (manufactured by Rigaku, Model: MiniFlex II). The radiation source was CuKα, and the accelerating voltage and current were 30 kV and 15 mA, respectively. The obtained X-ray diffraction diagram and X-ray diffraction data were analyzed using "PDXL," which is the software attached to the X-ray diffractometer. As a result, Examples 1 to 28 and Comparative Example 4 had a single phase of space group Fm-3m, Comparative Examples 2 and 3 had a mixed phase of a space group Fm-3m phase and a $Li_3NbO_4$ phase, Comparative Examples 5 and 6 had a mixed phase of a space group Pmmn phase and a $Li_3NbO_4$ phase, Comparative Example 1 had a single phase of space group I-43 m derived from $Li_3NbO_4$, and Comparative Example 7 had a single phase of space group Pmmn derived from $LiMnO_2$.

(Production of Nonaqueous Electrolyte Secondary Battery)

Using each of the lithium-transition metal composite oxides of Examples 1 to 28 and Comparative Examples 1 to 7 as a positive active material of a nonaqueous electrolyte battery, nonaqueous electrolyte secondary batteries were produced according to the following procedure, and the battery characteristics were evaluated.

A coating liquid containing a positive active material, acetylene black (AB), and polyvinylidene fluoride (PVdF) in a mass ratio of 70:20:10 and containing N-methylpyrrolidone as a dispersion medium was prepared. The coating liquid was applied to an aluminum foil current collector having a thickness of 20 μm, then heated on a hot plate at 120° C. for 40 minutes to volatilize the dispersion medium, and roll-pressed to form a positive electrode plate. The composite layer after pressing had a thickness of 20 μm, and the coating weight was 5 mg/cm$^2$.

Lithium metal was used for the counter electrode (negative electrode) to observe the independent behavior of the positive electrode. The lithium metal was firmly attached to a nickel foil current collector. However, it was adjusted so that the capacity of the nonaqueous electrolyte secondary battery would be sufficiently positive-electrode-regulated.

As an electrolyte solution, $LiPF_6$ was dissolved in a mixed solvent having an EC/DMC volume ratio of 1:1 to a $LiPF_6$ concentration of 1 mol/l and used. As a separator, a polypropylene microporous film surface-modified with polyacrylate and thus having improved electrolyte retentivity was used. Incidentally, a lithium metal foil was attached to a nickel plate and used as a reference electrode. As an outer case, a metal-resin composite film made of polyethylene terephthalate (15 μm)/aluminum foil (50 μm)/metal-adhesive polypropylene film (50 μm) was used. The electrodes were stored in the outer case in such a manner that the open ends of the positive electrode terminal, the negative electrode terminal, and the reference electrode terminal were exposed to the outside. The welding allowance of the metal-resin composite film, where the inner surfaces thereof face each other, was hermetically sealed, excluding a portion to serve as an electrolyte solution filling hole. From the electrolyte solution filling hole, the electrolyte solution was injected in a sufficient amount that would not cause a lack of solution in the produced battery; the same amount of electrolyte solution was injected to each battery. Subsequently, the electrolyte solution filling hole was heat-sealed while the battery was depressurized, thereby a lithium secondary battery was produced.

(Capacity Determination Test)

The nonaqueous electrolyte secondary batteries produced as above were placed in a thermostat set at 25° C. and subjected to one charge-discharge cycle. Charge was constant current constant voltage charge at a current of 0.1 CmA and a potential of 4.8 V. Charge was ended at the time when the current value was attenuated to 0.02 CmA. Discharge was constant current discharge at a current of 0.1 CmA to a final voltage of 1.0 V. In each cycle, a downtime of 30 minutes was established after charge and after discharge. With respect to the batteries of Examples 1 to 9 and Comparative Examples 1 to 4, energy (mWh) was calculated from the discharge capacity and discharge voltage at this time and then divided by the mass of the positive active material, and the quotient was taken as "energy density (mWh/g)." The results are shown in Table 1. Incidentally, in Examples 10 to 28 and Comparative Examples 1 and 5 to 7, the discharge capacity was divided by the mass of the active material, and the quotient was taken as "discharge capacity (mAh/g)." The results are shown in Table 2 and Table 3.

TABLE 1

| | Me | Li x | Nb y | Me z | Energy density (mWh/g) |
|---|---|---|---|---|---|
| Example 1 | Fe | 0.35 | 0.35 | 0.30 | 108 |
| Example 2 | Fe | 0.30 | 0.30 | 0.40 | 112 |
| Example 3 | Fe | 0.25 | 0.25 | 0.50 | 115 |
| Example 4 | Fe | 0.20 | 0.20 | 0.60 | 102 |
| Example 5 | Fe | 0.15 | 0.15 | 0.70 | 96 |
| Example 6 | Fe | 0.10 | 0.10 | 0.80 | 47 |
| Example 7 | Fe | 0.05 | 0.05 | 0.90 | 38 |
| Example 8 | Fe | 0.30 | 0.20 | 0.50 | 75 |
| Example 9 | Fe | 0.30 | 0.40 | 0.30 | 82 |
| Comparative Example 1 | Fe | 0.50 | 0.50 | 0.00 | 5 |
| Comparative Example 2 | Fe | 0.45 | 0.45 | 0.10 | 15 |
| Comparative Example 3 | Fe | 0.40 | 0.40 | 0.20 | 22 |
| Comparative Example 4 | Fe | 0.00 | 0.00 | 1.00 | 32 |

TABLE 2

| | Me | Li x | Nb y | Me z | Discharge capacity (mAh/g) |
|---|---|---|---|---|---|
| Example 10 | Mn | 0.35 | 0.35 | 0.30 | 207 |
| Example 11 | Mn | 0.30 | 0.30 | 0.40 | 230 |
| Example 12 | Mn | 0.25 | 0.25 | 0.50 | 222 |
| Example 13 | Mn | 0.20 | 0.20 | 0.60 | 208 |
| Example 14 | Mn | 0.15 | 0.15 | 0.70 | 202 |
| Example 15 | Mn | 0.10 | 0.10 | 0.80 | 145 |
| Example 16 | Mn | 0.05 | 0.05 | 0.90 | 120 |
| Example 17 | Mn | 0.30 | 0.35 | 0.35 | 210 |
| Example 18 | Mn | 0.30 | 0.25 | 0.45 | 218 |
| Example 19 | Mn | 0.30 | 0.45 | 0.25 | 153 |
| Example 20 | Mn | 0.30 | 0.15 | 0.55 | 167 |
| Comparative Example 1 | Mn | 0.50 | 0.50 | 0.00 | 10 |
| Comparative Example 5 | Mn | 0.45 | 0.45 | 0.10 | 47 |
| Comparative Example 6 | Mn | 0.40 | 0.40 | 0.20 | 105 |
| Comparative Example 7 | Mn | 0.00 | 0.00 | 1.00 | 108 |

TABLE 3

| | Li α | Nb β | Fe a | Mn b | Discharge capacity (mAh/g) |
|---|---|---|---|---|---|
| Example 21 | 0.215 | 0.215 | 0.19 | 0.38 | 280 |
| Example 22 | 0.12 | 0.12 | 0.38 | 0.38 | 255 |
| Example 23 | 0.31 | 0.31 | 0.19 | 0.19 | 252 |
| Example 24 | 0.215 | 0.215 | 0.38 | 0.19 | 247 |
| Example 25 | 0.12 | 0.12 | 0.57 | 0.19 | 244 |
| Example 26 | 0.12 | 0.12 | 0.19 | 0.57 | 250 |
| Example 27 | 0.25 | 0.25 | 0.12 | 0.38 | 276 |
| Example 28 | 0.155 | 0.155 | 0.12 | 0.57 | 258 |

Table 1 shows that when the lithium-transition metal composite oxides of Examples 1 to 9 represented by the compositional formula $Li_{1+x}Nb_yFe_zO_2$, wherein the molar ratio z of Fe is within a range of $0.25 \leq z < 1$, are used, the obtained energy density is higher than in the case of $Li_3NbO_4$ (Comparative Example 1) or $LiFeO_2$ (Comparative Example 4). Meanwhile, when the lithium-transition metal composite oxides of Comparative Examples 2 and 3, wherein the molar ratio z of Fe is within a range of $z<0.25$, are used, an energy density higher than in the case of $LiFeO_2$ (Comparative Example 4) cannot be obtained.

Incidentally, it turned out that it is preferable that the value of z is within a range of $0.25 \leq z \leq 0.7$ in that a particularly high energy density can be obtained. It also turned out that $0.9 \leq 2y+z \leq 1.1$ is satisfactory, and $2y+z=1$ is preferable. With respect to the relation between x and y, it turned out that $0 < |x-y| \leq 0.1$ is satisfactory, and $x=y$ is preferable.

Table 2 shows that when the lithium-transition metal composite oxides of Examples 10 to 20 represented by the compositional formula $Li_{1+x}Nb_yMn_zO_2$, wherein the molar ratio z of Mn is within a range of $0.25 \leq z < 1$, are used, the obtained discharge capacity is higher than in the case of $Li_3NbO_4$ (Comparative Example 1) or $LiMnO_2$ (Comparative Example 7). Meanwhile, when the lithium-transition metal composite oxides of Comparative Examples 5 and 6, wherein the molar ratio z of Mn is within a range of $z<0.25$, are used, a discharge capacity higher than in the case of $LiMnO_2$ (Comparative Example 7) cannot be obtained.

Further, it turned out that it is preferable that the value of z is within a range of $0.25 \leq z \leq 0.7$ in that a particularly high discharge capacity can be obtained. It also turned out that $0.8 \leq 2y+z \leq 1.2$ is satisfactory, and $2y+z=1$ is preferable. Incidentally, with respect to the relation between x and y, it turned out that $0 < |x-y| \leq 0.2$ is satisfactory, $|x-y| \leq 0.15$ is preferable, $|x-y| \leq 0.1$ is more preferable, $|x-y| \leq 0.05$ is still more preferable, and $x=y$ is most preferable.

Incidentally, the discharge energy density of Example 11 is calculated to be 690 mWh/g. From comparison with Example 2, it is shown that the presence of Mn in Me results in a higher energy density.

Tables 2 and 3 show that when the lithium-transition metal composite oxides of Examples 21 to 28, which are solid solutions of $Li_3NbO_4$—$LiFeO_2$—$LiMnO_2$ that satisfy the compositional formula $Li_{1+\alpha}Nb_\beta Fe_a Mn_b O_2$ ($0<\alpha<0.5$, $0<\beta<0.5$, $0<a<1$, $0<b<1$, $0<a+b<1$) are used, the obtained discharge capacity is higher than in the case of $Li_3NbO_4$ (Comparative Example 1) or $LiMnO_2$ (Comparative Example 7). Incidentally, in Examples 21 to 28, the obtained discharge capacity is higher than in Examples 10 to 20 using $Li_3NbO_4$—$LiMnO_2$ solid solutions.

Here, the discharge energy density of Example 21 is calculated to be 830 mWh/g. From comparison with the values in Example 2 and Example 11, it is shown that when Fe and Mn are applied as Me, and a $Li_3NbO_4$—$LiFeO_2$—$LiMnO_2$ solid solution is employed, a higher energy density can be obtained.

With respect to the operation effect of the composition of the lithium-transition metal composite oxide according to the present invention that affects the energy density, the inventor surmises as follows.

In the case where Fe is employed as Me, first of all, $LiFeO_2$ with a layered rock salt structure does not have a lithium ion (Li+) conduction path. Although Non-Patent Document 1 reports the charge-discharge characteristics of $LiFeO_2$ particles, it is believed that such discharge capacity is shown as a result of the physical reduction of diffusion length by the microparticulation of $LiFeO_2$ particles. Meanwhile, in the lithium-transition metal composite oxide according to the present invention, $LiFeO_2$ and $Li_3NbO_4$ are dissolved so that the molar ratio z of Fe in the compositional formula will be $0.3 \leq z < 1$. As a result, even with the same layered rock salt structure, depending on the configuration of primary particles and the arrangement of each element, the diffusion of $Li^+$ in the rock salt phase ($LiFeO_2$) is promoted. Accordingly, a high discharge capacity can be obtained without the microparticulation of particles. It is believed that this has made it possible to increase the energy density of an active material for a nonaqueous electrolyte energy storage device.

Incidentally, in the case where Mn is applied as Me, it is believed that when the molar ratio z of Mn in the compositional formula is at least a certain level ($0.3 \leq z < 1$), in addition to a solid solution of $LiMnO_2$ and $Li_3NbO_4$, a solid solution of $Li_2MnO_3$ and $Li_3NbO_4$ is also locally formed in the particles. As a result, the diffusion of $Li^+$ in the coexisting rock salt phase ($LiMnO_2$) is promoted upon an increase in the charge potential, and this is believed to increase the discharge capacity.

That is, in order to achieve this operation, it is believed to be preferable that the molar ratio z of Me in the compositional formula of a lithium-transition metal composite oxide is within a range of $0.3 \leq z < 1$.

Incidentally, in a $Li_3NbO_4$—$LiFeO_2$—$LiMnO_2$ solid solution, because Fe and Mn are both present, the problem that the Li-ion diffusion path is limited in the case where Fe is present alone and the problem that the structure of the rock salt phase is unstable in the case where Mn is present alone are both solved at the same time, and this is believed to increase the discharge capacity.

INDUSTRIAL APPLICABILITY

The active material for a nonaqueous electrolyte energy storage device of the present invention is excellent in terms of energy density and discharge capacity, and thus can be effectively used for nonaqueous electrolyte energy storage devices, such as power supplies for electric vehicles, power supplies for electronic devices, and power supplies for electric power storage.

DESCRIPTION OF REFERENCE SIGNS

1: Nonaqueous electrolyte secondary battery
2: Electrode group
3: Battery container
4: Positive electrode terminal
4': Positive lead
5: Negative electrode terminal
5': Negative lead
20: Energy storage unit
30: Energy storage apparatus

The invention claimed is:

1. An active material for a nonaqueous electrolyte energy storage device, comprising a lithium-transition metal composite oxide having a crystal structure attributable to space group Fm-3m and represented by the compositional formula (1):

$$Li_{1+x}Nb_yMe_zA_pO_2 \qquad (1)$$

wherein Me is a transition metal including Fe and/or Mn, $0<x<1$, $0<y<0.5$, $0.25 \leq z<1$, A is an element other than Nb and Me, and $0 \leq p \leq 0.2$.

2. The active material for a nonaqueous electrolyte energy storage device according to claim 1, wherein $0.05 \leq y \leq 0.35$ and $0.8 \leq 2y+z \leq 1.2$.

3. The active material for a nonaqueous electrolyte energy storage device according to claim 1, wherein $0.15 \leq y \leq 0.35$.

4. The active material for a nonaqueous electrolyte energy storage device according to claim 1, wherein $0.9 \leq 2y+z \leq 1.1$.

5. The active material for a nonaqueous electrolyte energy storage device according to claim 1, wherein Me contains Mn.

6. The active material for a nonaqueous electrolyte energy storage device according to claim 1, wherein when the compositional formula (1) is represented by the compositional formula (2):

$$Li_{1+x}Nb_yFe_aMn_bA_pO_2 \qquad (2),$$

$0.1<a<0.6$ and $0.1<b<0.6$.

7. The active material for a nonaqueous electrolyte energy storage device according to claim 1, wherein $0.3<z<0.7$.

8. The active material for a nonaqueous electrolyte energy storage device according to claim 1, wherein $|x-y| \leq 0.2$.

9. The active material for a nonaqueous electrolyte energy storage device according to claim 1, wherein $|x-y| \leq 0.15$.

10. The active material for a nonaqueous electrolyte energy storage device according to claim 1, wherein $|x-y| \leq 0.1$.

11. The active material for a nonaqueous electrolyte energy storage device according to claim 1, wherein $|x-y| \leq 0.05$.

12. The active material for a nonaqueous electrolyte energy storage device according to claim 1, wherein $x=y$, and $2y+z=1$.

13. An electrode for a nonaqueous electrolyte energy storage device, comprising the active material for a nonaqueous electrolyte energy storage device according to claim 1.

14. A nonaqueous electrolyte energy storage device comprising the electrode for a nonaqueous electrolyte energy storage device according to claim 13.

15. An energy storage system comprising the nonaqueous electrolyte energy storage device according to claim 14.

* * * * *